Jan. 29, 1963 N. C. HUNT ETAL 3,075,552
METHODS OF AND MEANS FOR PROVIDING SAFE OPERATION OF DEVICES
Filed Sept. 17, 1956 2 Sheets-Sheet 1
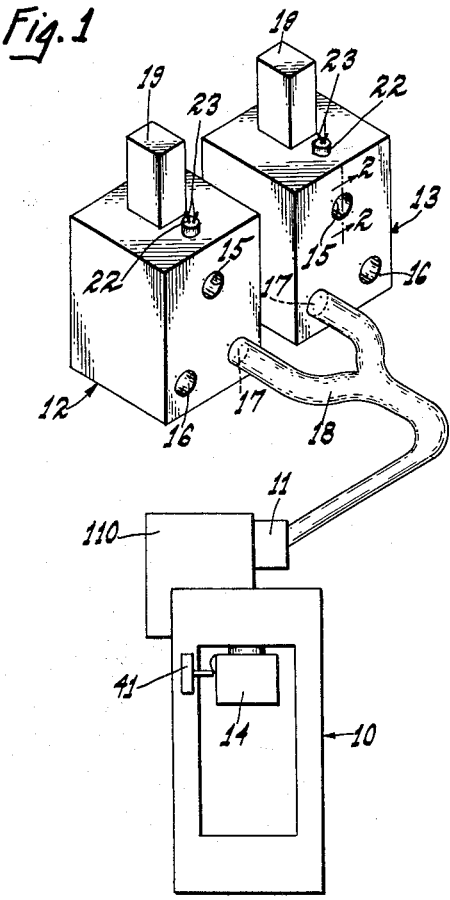
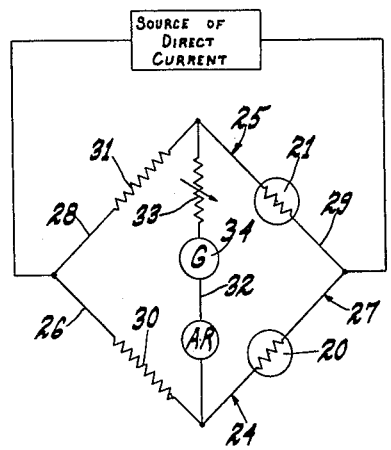
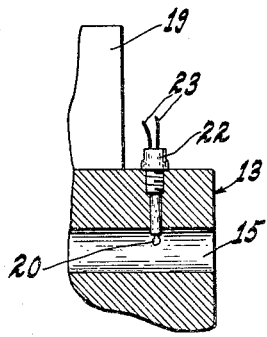
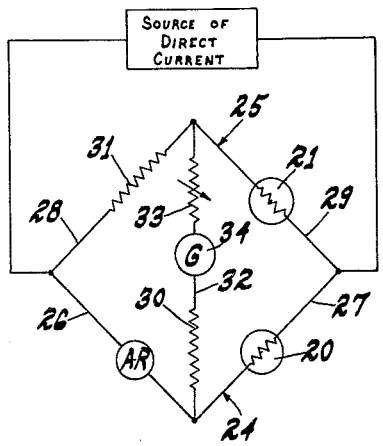
INVENTORS
NATHAN C. HUNT
ALBERT W. HAINLIN
DOYLE E. LOCKWOOD
BY
ATTORNEY

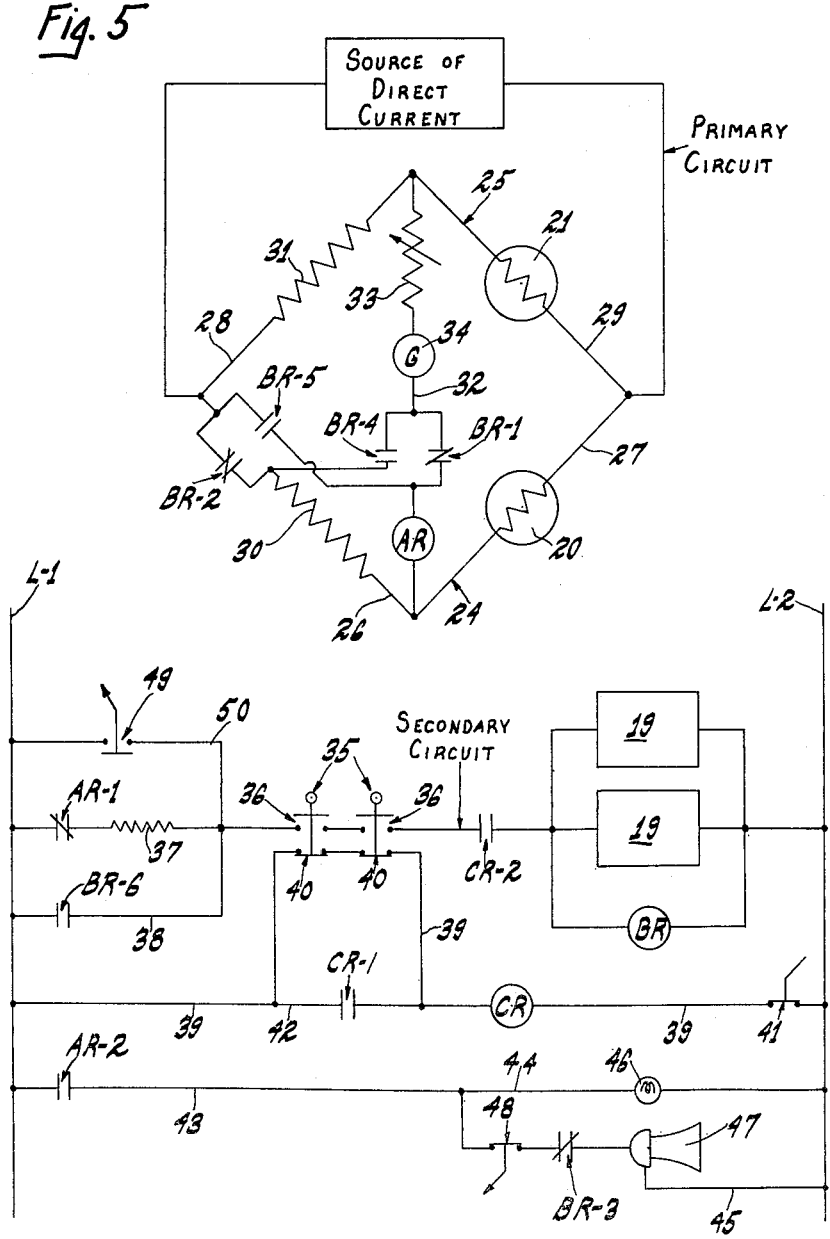

United States Patent Office 3,075,552
Patented Jan. 29, 1963

3,075,552
METHODS OF AND MEANS FOR PROVIDING SAFE OPERATION OF DEVICES
Nathan C. Hunt, Salem, Ohio, Albert W. Hainlin, Coral Gables, Fla., and Doyle E. Lockwood, Los Angeles, Calif., assignors, by mesne assignments, to International Basic Economy Corporation, New York, N.Y., a corporation of New York
Filed Sept. 17, 1956, Ser. No. 610,276
7 Claims. (Cl. 137—620)

The present invention relates to safety, more particularly to methods of and means for the early detection of a potentially dangerous malfunction in apparatus before such malfunction results in injury to the apparatus and/or to an operator thereof, and the principal object of the invention is to provide new and improved methods and means of such character.

Briefly, the present invention is adapted for use with apparatus in which certain malfunctions may have serious consequences in that the apparatus may be damaged and/or the operator of such apparatus may be subjected to certain hazards.

In the past, such malfunctions have been detected only by the consequences which flow therefrom or by periodic inspections or tests to locate them in their early stages. This, it will be appreciated, has not been entirely satisfactory.

In contrast, the present invention functions as a continuous sentinel to detect malfunctions as soon as they occur and before they result in serious consequences. This is accomplished in a relatively simple manner which is highly effective and fool-proof in operation. Other advantages will readily become apparent from a study of the following description and from the drawings appended hereto.

In the drawings accompanying this specification and forming a part of this application there is shown, for purpose of illustration, an embodiment which the invention may assume, and in these drawings:

FIGURE 1 is a diagrammatic representation of any suitable well-known apparatus, such as a press and associated devices, with which the present invention is adapted to be employed, FIGURE 2 is a fragmentary sectional view generally corresponding to the line 2—2 of FIGURE 1, FIGURE 3 is a schematic diagram of an electrical circuit and its associated parts employed in carrying out the present invention, such circuit being shown at one stage of operation and having been simplified by the omission of certain parts in the interest of clarity, FIGURE 4 is a view similar to FIGURE 3 but showing the parts as they are arranged in the circuit at a different stage of operation, and FIGURE 5 is a schematic diagram of the entire electrical circuit employed in carrying out the present invention.

For purpose of illustration, this invention is shown applied to a mechanical press 10 of the type having an air operated clutch 11 whose engagement and disengagement is controlled by a pair of solenoid operated air valves 12 and 13. It is to be understood, however, that the present invention may readily be employed with presses of other types and with apparatus other than presses. Furthermore, while valves 12 and 13 are shown in separate housings in the interest of clarity, such valves will normally be included in the same housing.

Press 10 has a suitable drive 110 which is adapted to be operably engaged with the slide 14 of the press to effect movement thereof from its uppermost position shown when air under pressure is admitted to clutch 11 by valves 12 and 13. When valves 12 and 13 exhaust air from the clutch, the drive 110 is disengaged from the press and the slide 14 comes to rest. While only one valve could be employed to control air flow to and from clutch 11, it is preferable, for safety purposes, to employ two valves. In this way, in the event one valve fails for any reason while the clutch is engaged, the other valve by exhausting air from the clutch, will insure release of the clutch to prevent an unexpected and highly dangerous repeat action of the press. Moreover, in the event the clutch is disengaged, it can not be engaged unless both valves operate since the inoperative valve, with its open exhaust, will prevent the build up of air pressure within the clutch and therefore prevent its engagement.

Each valve 12 and 13 may be of any suitable construction and each has an inlet port 15 adapted to be connected by a conduit (not shown) to a suitable source of air pressure, an exhaust port 16 and an outlet port 17 connected to clutch 11 by means of a conduit 18. In the normal position of the valves, that is, with respective operating solenoids 19 de-energized, each valve will have its inlet 15 blocked from communication with the other two ports and its outlet 17 in communication with its exhaust 16. Clutch 11 will therefore be disengaged and the press will be at rest with its slide 14 at the top of its stroke.

As will later be more fully disclosed, when it is desired to initiate a cycle of operation of the press, both solenoids 19 will be energized. This will cause the inlets 15 of the valves to be placed in communication with their outlets 17 and their exhausts 16 to be blocked from communication with the other two ports. Air under pressure will now flow to clutch 11 to engage the press drive 110 and effect a cycle of movement of slide 14. By means later to be disclosed, when slide 14 has completed a cycle, for example, when it has returned to its upper position shown following a down stroke, the solenoids will be de-energized to return the valves to their original positions wherein the clutch will be disengaged by exhausting pressure therefrom as before described.

In the event of a certain amount of leakage of either valve, the above operation would not be affected. For example, a small amount of leakage of air through the intake of one valve when the solenoids are de-energized and when such intake should be blocked would not engage the clutch since such air would immediately escape through the open exhausts. Likewise, leakage of a small amount of air through the exhaust of one valve when the solenoids are energized and when such exhaust should be blocked would not disengage the clutch since the lost air pressure would immediately be replenished from the source. Such leakage at one valve, while it may not be dangerous at the onset because such leakage is not of sufficient magnitude to affect proper valve action, is an indication that a malfunction exists. This malfunction, though slight at first, can be expected to increase with continued valve operation until engagement or disengagement of the clutch becomes erratic and unpredictable.

To prevent unpredictable clutch action with the attendant hazard to the press operator and possible damage to the press, means are provided for the early detection of a malfunctioning valve before such malfunction reaches serious proportions. This is accomplished by so positioning a pair of thermally responsive members 20, 21 that their temperatures will be modified by the air controlled by respective valves and by comparing the temperatures of such members, as modified by the controlled air, to ascertain when there is a change in the relative air flow through respective valves. It will readily be apparent that a change in the relative air flow through the valves indicates that one or the other valve is beginning to operate improperly.

At the present time it is preferable to employ, as thermally responsive members 20, 21, a pair of components known as thermistors. These thermistors are a commercially available device whose resistance to current flow changes quite rapidly with a change in temperature. As seen in FIGURE 2, each thermistor 20, 21 is preferably mounted in a respective sleeve member 22 which is threaded in a respective valve body so that each thermistor is subjected to temperature modification by the air at respective inlet ports 15. It will readily be apparent that the thermistors may be located at places other than at the valve intake ports so long as the thermistors are positioned for temperature modulation by the air controlled by respective valves. A pair of leads 23 extend from each thermistor to provide for connection thereof into an electrical circuit.

Thermistors 20, 21 are disposed in an electrical circuit, shown in simplified form in FIGURE 3, and hereinafter referred to as the primary circuit. The primary circuit is arranged to provide a pair of parallel branches 24, 25 which divide current flow through the circuit. Branch 24 is formed of legs 26, 27 in series with each other and branch 25 is formed of legs 28, 29 also in series with each other. Thermistors 20, 21 are interposed in respective legs 27, 29 and resistors 30, 31 are interposed in respective legs 26, 28. A by-pass circuit 32 extends between branches 24, 25 intermediate the resistor and thermistor in respective branches. Herein shown connected in series in by-pass circuit 32 is a variable resistor 33, a galvanometer 34 and the solenoid coil AR of a solenoid actuated relay or contactor. For a purpose later to appear, the resistance of coil AR is preferably identical to that of resistor 30. The resistance of resistor 31 is the same as that of resistor 30 and the resistance of thermistor 20 is the same as that of thermistor 21. Although not shown, one or more of the legs 26, 27, 28 and 29 may have means therein for adjusting the resistance of the respective legs so that the resistance across leg 26 is the same as that across leg 28 and the resistance across leg 27 is the same as that across leg 29.

From the foregoing it will be evident that a Wheatstone bridge circuit has been provided and that if current from a suitable source is passed through the primary circuit, the current will divide along branches 24, 25. So long as the total resistance of each branch 24, 25 is identical, no current will flow in the by-pass circuit 32. However, in the event the relative resistance of the branches changes, current will flow in by-pass circuit 32. The primary circuit is herein shown to be energized from a suitable source of direct current although alternating current would as well be employed. However, since more sensitive relays are available for use with direct current, it is preferable that this circuit be designed for use with the latter.

Assuming that thermistors 20, 21 are at the same temperature (such condition occurring when both valves 12 and 13 are functioning properly), the resistance of branches 24, 25 will be the same and no current will flow in by-pass circuit 32. If, however, one of the valves begins to leak or otherwise malfunctions, the relative temperature of the thermistors will change and there will accordingly be a change in their relative resistances. This change in relative resistance will unbalance the branches 24, 25 and cause current to flow in the by-pass circuit 32. Current flowing in by-pass circuit 32 will energize solenoid coil AR and energization thereof can be employed to open a circuit (hereinafter to be referred to as the secondary circuit) in which solenoids 19 of valves 12, 13 are disposed to thereby prevent operation of the valves and consequent engagement of the clutch 11 and operation of the press.

Variable resistance 33 is provided for adjustment of the sensitivity of solenoid coil AR. By way of illustration, the greater the resistance put in by-pass circuit 32, the less sensitive will be solenoid coil AR to a temperature differential between the thermistors. Galvanometer 34 is provided so that an operator, by observing the direction of needle deflection, can readily observe which valve is functioning improperly, however, it will be evident that the galvanometer may be omitted in the event the information imported thereby is not considered essential.

As previously mentioned, when both valves are operating properly, no appreciable amount of current will flow through by-pass circuit 32. It should be pointed out that there may be a very slight flow of current in circuit 32 each time the valves are operated due to the fact that the valves, being independent, may not work precisely in unison. However, this current flow will persist but momentarily and will be too small to energize solenoid coil AR. Since, under normal conditions, little or no current flows through by-pass circuit 32, there is a possibility that the relay, or contactor, of which solenoid coil AR is a part might deteriorate from non-use and could not be depended upon to function properly when its operation is required when one of the valves begins to malfunction.

In order to prevent deterioration of the aforementioned relay, the present embodiment provides for the exercise thereof during each cycle of operation of the press. This is done by transposing solenoid coil AR with resistor 30 during each cycle of operation of the press. As indicated in FIGURE 4, resistor 30 is momentarily positioned in by-pass circuit 32 while solenoid coil AR is momentarily positioned in leg 26 of branch circuit 24. This causes current to flow through solenoid coil AR to exercise the relay of which it is a part. It will be noted that the balance between branches 24 and 25 will not be disturbed by this transposition since resistor 30 and solenoid coil AR have identical resistances. As will later be disclosed, during the time that solenoid coil AR is being exercised, the relay of which it is a part will not be permitted to affect flow of current in the secondary circuit to solenoids 19 of the valves 12 and 13.

Referring to FIGURE 5 wherein the electrical circuits employed are shown in their entirety, it will be noted that the previously mentioned secondary circuit extends across power lines L-1 and L-2 and includes solenoids 19 of valves 12 and 13 and a solenoid coil BR of a suitable relay having normally closed contacts BR-1, BR-2 and BR-3 and normally open contacts BR-4, BR-5 and BR-6. Normally closed contacts BR-1 and BR-2 and normally open contacts BR-4 and BR-5 are disposed in the primary circuit, as seen in FIGURE 5, to effect the aforementioned transposition of solenoid coil AR and resistor 30 in a manner to become clear.

The secondary circuit includes, in addition to solenoids 19 and solenoid coil BR, a pair of operating buttons 35 each having normally open contacts 36 in this circuit. This circuit also has normally closed contacts AR-1 which are controlled by solenoid coil AR and a current limiting resistor 37 which protects contacts AR-1 against heavy current surges. A shunt circuit 38 extends around contacts AR-1 and contains normally open contacts BR-6 controlled by solenoid coil BR.

A circuit 39 extends across lines L-1 and L-2 through normally closed contacts 40 carried by respective operating buttons 35. Circuit 39 includes a solenoid coil CR of a relay having normally open contacts CR-1 and CR-2 and further includes a limit switch 41 having normally closed contacts. This limit switch is carried by the press 10 (see FIGURE 1) and has an actuator which is adapted to engage a cam or the like carried by slide 14 of the press. The operation of the limit switch is such that when slide 14 of the press approaches its uppermost position on the upstroke of the press, the contacts of the limit switch will momentarily open and thereafter close again. This momentary opening will stop slide 14 in its uppermost position, ready for the next cycle, as will be disclosed. Any suitable arrangement may be provided whereby the contacts of the limit switch will not be opened upon downward movement of the slide. A circuit 42 shunts around contacts 40 of push buttons 35 and this circuit contains contacts CR–1 controlled by solenoid coil CR. Contacts CR–2, also controlled by solenoid coil CR, are interposed in the previously described secondary circuit.

A circuit 43 having branches 44, 45 is connected across lines L–1 and L–2. Branch 44 contains a signal lamp 46 while branch 45 contains a warning device such as a horn or the like 47. Normally open contacts AR–2, controlled by solenoid coil AR, are disposed in circuit 43 and normally closed contacts BR–3, controlled by solenoid coil BR, are disposed in branch 45. A switch 48 is also disposed in branch 45 to render device 47 inoperative when desired.

Assuming that drive 110 is ready to transmit power to slide 14 of the press to effect reciprocation thereof upon engagement of clutch 11; that air under pressure is connected to respective inlets 15 of valves 12 and 13, that current is flowing in the primary circuit and that push buttons 35 in the secondary circuit are in the position shown, all of the components shown in FIGURE 5 will be in the positions illustrated. If lines L–1 and L–2 are now connected to a suitable source of electrical energy, current will flow through solenoid coil CR through circuit 39 via the closed contacts of limit switch 41 and the closed contacts 40, 40 of push buttons 35. This will energize solenoid coil CR and close contacts CR–1 in shunt circuit 42 to keep CR energized independently of push button contacts 40, 40. Energization of CR will also close contacts CR–2 in the secondary circuit; however, this latter circuit remains open because of the open contacts 36, 36 of the push buttons.

In the event both valves 12 and 13 are operating properly, thermistors 20, 21 will have the same resistance and therefore the bridge of the primary circuit will be balanced and no current will flow through by-pass circuit 32 to energize solenoid coil AR. Since AR is not energized, contacts AR–1 remain closed so that pressing both push buttons 35 downwardly will close respective contacts 36 thereof to complete the secondary circuit and energize both solenoids 19 of valves 12 and 13 and solenoid coil BR. With solenoids 19 energized a cycle of operation of the press will be initiated since the inlets 15 of valves 12 and 13 will be connected to their respective outlets 17 to admit air pressure to clutch 11 to operably engage drive 110 with the slide 14 of the press.

Upon energization of solenoid coil BR simultaneously with solenoids 19, the former will open its normally closed contacts BR–1, BR–2 and BR–3 and close its normally open contacts BR–4, BR–5 and BR–6. The closing of contacts BR–4 and BR–5 and the opening of contacts BR–1 and BR–2 will transpose resistor 30 from leg 26 to by-pass circuit 32 and transpose solenoid coil AR from the by-pass circuit to leg 26. With solenoid coil AR in leg 26, current will flow through the coil to effect energization thereof to open contacts AR–1 and close contacts AR–2. This operation exercises the relay of which solenoid coil AR is a part so that such relay will not deteriorate from nonuse. The opening of contacts AR–1 would normally open the secondary circuit; however, since contacts BR–6 are now closed in shunt circuit 38, current will flow uninterruptedly through the secondary circuit. The closing of contacts AR–2 will light warning lamp 46 to indicate to the operator that the relay of which solenoid coil AR is a part is functioning properly; however, warning horn 47 will not sound because contacts BR–3 in branch 45 have been opened by energization of solenoid coil BR.

In the present embodiment, the operator is required to push buttons down to keep contacts 36, 36 closed until the press completes a cycle of operation. It will readily be apparent, however, that means could be provided to permit the operator to release the push buttons, after a cycle has been initiated, without interrupting the operation until such cycle has been completed. As the press approaches completion of a cycle; that is, as slide 14 approaches its uppermost position, limit switch 41 will be opened momentarily. This will interrupt circuit 39, de-energize solenoid coil CR and open contacts CR–1 and CR–2.

With the opening of contacts CR–2, the secondary circuit will be interrupted to de-energize solenoids 19 and solenoid coil BR. With solenoids 19 de-energized, the outlets 17 of valves 12 and 13 will be connected to exhausts 16 and the inlets 15 will be closed against communication with either ports 16 or 17. This will disengage the clutch and permit slide 14 to come to rest. Note that solenoid coil CR will remain de-energized until such time as push buttons 35 are released to permit their return to the position shown. This prevents initiation of another cycle without first releasing the push buttons and pressing them down once again.

Returning once again to the position of parts shown in FIGURE 5 but with solenoid coil CR energized to close contacts CR–1 and CR–2, it will now be assumed that one of the valves 12, 13 is leaking or otherwise malfunctioning. In such circumstance, a differential temperature and a corresponding difference in resistance will exist between thermistors 20, 21. This will cause current to flow in the by-pass circuit 32 to thereby energize solenoid coil AR and open its contacts AR–1 and close its contacts AR–2. Opening of contacts AR–1 will open the secondary circuit and prevent energization of solenoids 19 and solenoid coil BR by operating the push buttons 35, 35. Accordingly, clutch 11 will not be engaged to initiate a cycle of operation of the press. Additionally, the closing of contacts AR–2 will light the warning lamp 46 and sound the warning horn 47.

Under certain circumstances it may be desirable to permit continued operation of the press, despite a slight malfunction, until such time as work schedules permit repair. For this purpose, a switch 49 is interposed in a circuit 50 which shunts around contacts AR–1. With this switch closed, the secondary circuit will not be under the control of the primary circuit. It is preferable that switch 49 be of the key locking type so that only supervisory or other authorized personnel may close the switch and thus defeat the safety function provided by the present invention.

In view of the foregoing it will be apparent to those skilled in the art that we have accomplished at least the principal object of our invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that our invention is not limited thereto.

We claim:

1. The combination comprising a pair of solenoid actuated fluid valves each having an inlet port, said valves being adapted to control flow of fluid to initiate each cycle of cyclically operated apparatus upon energization of both solenoids, a pair of electrical circuits including a secondary circuit for energizing said solenoids and a primary circuit through which current flows for controlling said secondary circuit, said primary circuit having a pair of branches arranged in parallel to divide current flow through such circuit, a pair of electrically conductive members interposed in respective branches of said primary circuit, each member being disposed for temperature modulation by the fluid at respective inlet ports and each having the characteristic of changing its resistance to current flow in accordance with changes in its temperature, a by-pass circuit connecting said parallel branches of said primary circuit and through which current is adapted to flow when a change in the relative temperature of said members caused by a relative change in fluid flow at respective inlet ports causes a relative change in resistance of said members, switch means interposed in said secondary circuit and normally arranged for non-interference with current flow to said solenoids, switch actuating means interposed in said by-pass circuit and responsive to current flow therein, prior to each cycle of operation of said device, caused by the relative change in resistance of said members to effect operation of said switch means and prevent energization of said solenoids and consequent initiation of operation of said apparatus upon a change in the relative temperature of said members, and means for exercising said switch actuating means by passing current therethrough during each cycle of operation of said apparatus to prevent deterioration of said switch actuating means through non-use and insure its operation to prevent initiation of operation of said apparatus in the event of a change in the relative temperature of said members caused by a relative change in fluid flow at respective inlet ports.

2. The combination comprising a pair of solenoid actuated fluid valves controlling flow of fluid to effect operation of apparatus upon energization of both solenoids, a pair of electrically conductive members whose resistance to current flow therethrough changes at the same rate in accordance with temperature changes thereof and each disposed for temperature modulation by the fluid controlled by respective valves, an electrical circuit including said members through which current flows in the same manner despite a change in temperature of the same magnitude and in the same direction of both members, and means responsive to a change in current flow through said circuit caused by a change in the relative temperature of said members to prevent energization of the solenoids and consequent operation of the apparatus upon a relative change in the flow of fluid controlled by respective valves.

3. The construction of claim 2 wherein said electrically conductive members are thermistors.

4. The construction of claim 2 wherein fluid flows through parallel fluid circuits to effect operation of said apparatus and wherein each valve is disposed in a respective one of said fluid circuits to control fluid flow therethrough.

5. The combination comprising a pair of solenoid actuated fluid valves controlling flow of fluid to effect operation of apparatus upon energization of both solenoids, a secondary electrical circuit including the solenoids of said valves for effecting solenoid energization, a primary electrical circuit having a pair of branches arranged in parallel to divide current flow therethrough and further having a by-pass circuit connecting together intermediate portions of said primary circuit branches to divide each branch into two segments one disposed on one side of said by-pass circuit and the other disposed on the other side thereof, a pair of electrically conductive members whose resistance to current flow therethrough changes at the same rate in accordance with temperature changes thereof, said members being respectively interposed in those segments of respective primary circuit branches disposed on said one side of said by-pass circuit and each member being disposed for temperature modulation by the fluid controlled by respective valves, switch means interposed in said secondary circuit and normally arranged for non-interference with current flow therethrough to the valve solenoids, and means responsive to current flow in said by-pass circuit caused by a change in the relative temperature of said members to shift said switch means from its normal position to a position wherein it interrupts said secondary circuit to prevent energization of the valve solenoids and consequent operation of the apparatus upon a relative change in the flow of fluid controlled by respective valves.

6. In combination: cyclically operated apparatus, a pair of solenoid operated valves operable to initiate a cycle of operation of said apparatus, a pair of electrical circuits including a secondary circuit for operating said control means and a primary circuit for controlling said secondary circuit, a pair of electrically conductive members included in said primary circuit, said members each being disposed for temperature modulation by the fluid controlled by respective valves and each having the characteristic of changing its resistance to current flow in accordance with changes in its temperature, switch means interposed in said secondary circuit and normally arranged for non-interference with operation of said control means, and means for sampling current flow in said primary circuit caused only by a relative change in resistance of said members to effect operation of said switch means and prevent operation of said control means and consequent operation of said apparatus upon a change in the relative temperature of said members.

7. Control means comprising a pair of electrical circuits including a secondary circuit for initiating each cycle of cyclically operated apparatus and a primary circuit through which current flows for controlling said secondary circuit, said secondary including the solenoids of a pair of solenoid actuated fluid valves, said valves being adapted to control flow of fluid to effect each cycle of operation of said cyclically operated apparatus upon energization of both solenoids, said primary circuit having a pair of branches arranged in parallel to divide current flow through such circuit, a pair of electrically conductive members interposed in respective branches of said primary circuit, said members each being subjected to individual thermal changes and disposed for temperature modulation by the fluid controlled by respective values, each of said conductive members having the characteristic of changing its resistance to current flow in accordance with changes in its temperature, a by-pass circuit connecting said parallel branches of said primary circuit and through which current is adapted to flow when a change in the relative temperature of said members causes a relative change in resistance thereof, switch means interposed in said secondary circuit and normally arranged for non-interference with initiation of operation of said apparatus, switch actuating means normally interposed in said by-pass circuit and responsive to current flow therein, prior to each cycle of operation of said apparatus and caused by a relative change in resistance of said members, to effect operation of said switch means and prevent initiation of operation of said apparatus upon a change in the relative temperature of said members, and means for exercising said switch actuating means by transposing the latter from said by-pass circuit to one of said branches during each cycle of operation of said apparatus to pass current through said switch actuating means to prevent deterioration thereof through non-use and insure its operation to prevent initiation of operation of said apparatus in the event of a change in the relative temperature of said members.

References Cited in the file of this patent

UNITED STATES PATENTS

| | | |
|---|---|---|
| 1,224,332 | Smith | May 1, 1917 |
| 1,358,718 | Fortescue | Nov. 16, 1920 |
| 1,896,856 | Traver | Feb. 7, 1933 |
| 2,482,524 | Vrooman | Sept. 20, 1949 |
| 2,690,192 | Dannhardt | Sept. 28, 1954 |
| 2,717,002 | Lucien | Sept. 6, 1955 |
| 2,848,657 | Fisher | Aug. 19, 1958 |

UNITED STATES PATENT OFFICE
CERTIFICATE OF CORRECTION

Patent No. 3,075,552                            January 29, 1963

Nathan C. Hunt et al.

It is hereby certified that error appears in the above numbered patent requiring correction and that the said Letters Patent should read as corrected below.

Column 8, line 24, after "secondary" insert -- circuit --; line 34, for "values" read -- valves --.

Signed and sealed this 17th day of Setpember 1963.

(SEAL)
Attest:

ERNEST W. SWIDER
Attesting Officer

DAVID L. LADD
Commissioner of Patents